May 17, 1949. H. R. MARINI 2,470,509
METHOD OF MAKING HEATED WINDOW GLASS
Filed May 2, 1945
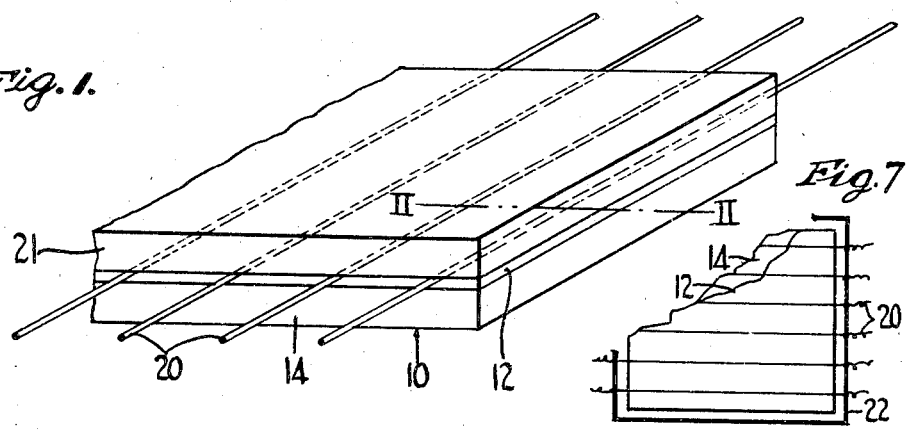
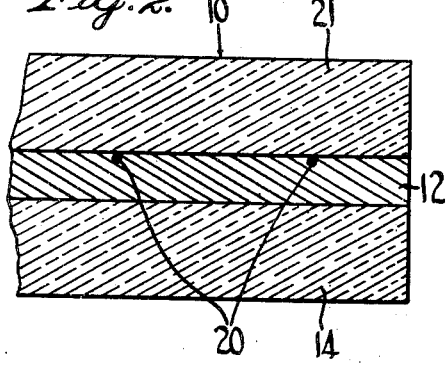
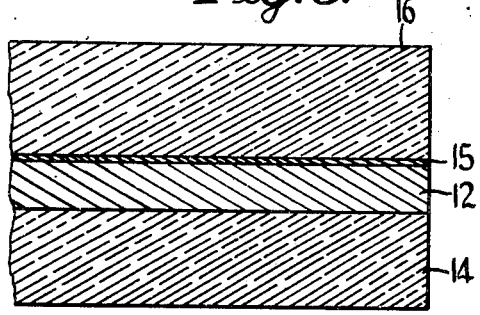
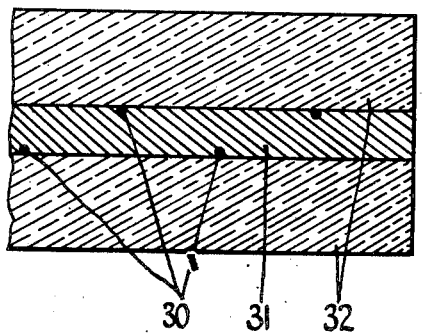
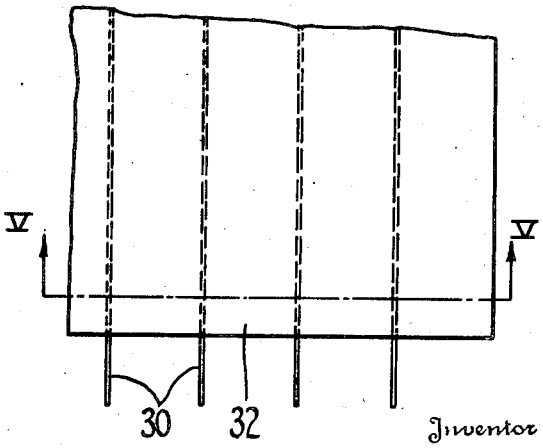
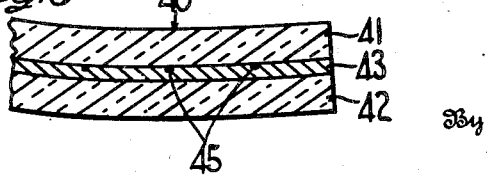
Inventor
HERMAN R. MARINI
By Olen E. Bee
Attorney Patented May 17, 1949

2,470,509

UNITED STATES PATENT OFFICE 2,470,509

METHOD OF MAKING HEATED WINDOW GLASS

Herman R. Marini, New Kensington, Pa., assignor to Pittsburgh Plate Glass Company, Allegheny County, Pa., a corporation of Pennsylvania Application May 2, 1945, Serial No. 591,556

7 Claims. (Cl. 154—2.81)

This invention relates to methods of making laminated glass and it has particular relation to methods of making defrosting laminated units in which metal heating strands are interposed between laminations and are adapted to be energized electrically.

One object of the invention is to provide an improved method of making a laminated glass unit in which conductors of electricity in the form of fine strands are so incorporated as to prevent disarrangement thereof during assembly of the glass and plastic of the laminated unit.

Another object of the invention is to provide an improved method of making a defrosting unit in which metal strands are held in place by the plastic interlayer of the unit and are in contact with one of the glass plates in the structure.

The invention in one of its important phases involves a method which is practiced by spreading plastic interlayer material upon a glass plate and the exposed surface of the interlayer material is molded and smoothed by so-called press polishing; that is, by applying a polished glass plate thereto under sufficient pressure to render the plastic surface very smooth. In order to prevent the smoothing and polishing glass plate from adhering to the plastic interlayer material, a masking sheet of regenerated cellulose acetate, or other thin and smooth material which does not adhere readily to the plastic is applied to the latter before the polishing cover plate is pressed thereon. In handling a unit built up in this manner, heat and pressure are applied until the plastic interlayer is thoroughly pressed and molded to the shape it is finally to assume between the glass plates. Such heat and pressure are effected in an autoclave.

After the plastic sheet has been pressed and smoothed in this manner, the cover plate and masking sheet are removed. Then strands, such as wires or metal ribbons are laid upon the smooth surface of the molded plastic sheet to which they are bonded and the additional glass plate of the unit is applied thereto. A final application of heat and pressure serves to bond together the elements of the unit with the wires in contact with the plate last applied. This final treatment under proper conditions of heat and pressure is effected in an autoclave in accordance with well-known practice in the art of laminating glass plates.

In the drawings,

Fig. 1 is a fragmentary perspective of a laminated unit in the making of which the invention has been employed; Fig. 2 is a fragmentary cross section on a larger scale taken substantially along the line of II—II Fig. 1; Fig. 3 is a fragmentary cross section similar to Fig. 2 and illustrating in intermediate steps of the method; Fig. 4 is a fragmentary plan of another form of laminated unit; Fig. 5 is a cross section taken substantially along the line V—V of Fig. 4; Fig. 6 is a cross-section similar to Fig. 2 and in which curved glass plates are employed; and Fig. 7 is a diagrammatic fragmentary plan showing wires on a frame as applied to a portion of a laminated unit.

Referring to Figs. 1, 2, and 3, a laminated unit 10 is manufactured by a method which includes the application of an interlayer 12 of organic plastic or resin upon a glass plate 14 which is ground and polished, or it can be in the form of drawn window glass, and then a sheet 15 of regenerated cellulose acetate, commonly known as cellophane, or other material which will not adhere readily to the plastic interlayer, is applied to the exposed surface of the latter under pressure of a cover plate 16 of polished glass. The interlayer 12 can be in the form of vinyl acetal resin or other known types of resins employed in making laminated glass.

The elements 12, 14, 15, and 16 of the assembly, as indicated above are placed in an autoclave and subjected to treatment by the application of heat and pressure similarly to the treatment of such elements in the conventional manufacture of laminated glass, with the exception that the press plate 16 is prevented from adhering to the plastic interlayer by the interposed cellophane sheet 15. Such treatment is resorted to for the purpose of molding the plastic interlayer to the exact form it will assume in the unit in its completed form.

After this preliminary treatment of the assembly, the two elements 15 and 16 are removed to expose a smooth polished outer surface of the plastic interlayer 12. Fine strands 20 of material which will conduct electricity are applied to the surface of the interlayer in any pattern desired, usually in spaced parallel relation with the ends of the strands extending beyond the edges of the glass. A final glass plate 21 is applied as a part of the laminated defrosting unit upon the smooth surface of the interlayer to cover the strands 20 in contact with the latter so that this plate can be heated by suitable electric connections.

Preliminary bonding of the elements 12, 14, and 21 of the assembly is accomplished by passing them between nipper rolls after which the unit can be handled and placed in an autoclave where it is subjected to sufficient heat and pressure to bond these elements firmly together in their final form.

The strands 20 can be in the form of wires as small as or smaller than .005 of an inch in diameter. Likewise, they can be in the form of very thin and narrow metal ribbons. These strands which extend a considerable distance beyond the edges of the unit are adapted to be energized by conventional electric apparatus to supply heat to the laminated unit.

In order to facilitate the application of the wires 20 in a predetermined arrangement upon the interlayer, such wires can be secured to opposite sides of a skeleton frame 22 which is of light construction. In order to maintain the wires straight, they are slightly tensioned across the frame which surrounds the interlayer 12 and plate 14 and the wires are of sufficient length to insure proper extension beyond the edges of the glass. After the positioning of the upper plate 21 in superposed relation upon the interlayer and in contact with the wires, the latter can be disengaged from the frame which then is removed preparatory to final treatment of the laminated unit in the autoclave. On the other hand, it may be desirable to permit the frame with the wires attached to remain until the final bonding of the elements of the unit has been accomplished.

Under certain conditions it may be desirable, as shown in Figs. 4 and 5, to apply electric conductors 30 on opposite sides of a plastic interlayer 31 which is the same type as that shown in Figs. 1 to 3. In this arrangement, the interlayer 31 can be pressed and molded between two plates 32 with interposed cellophane sheets corresponding to the sheet 15 between the glass and interlayer on opposite sides of the latter. The pressing and molding operation is accomplished in an autoclave as described above. One of the plates 32, together with its masking sheet of cellophane, is then removed and the wires 30 are applied to the smoothed interlayer surface which is thus prepared to receive such wires in properly spaced relation. While the wires are held in proper position, the glass plate is reapplied directly in contact with the interlayer and wires. Then the other glass plate, together with its masking sheet of cellophane, is removed and the wires applied in the same manner as that just described. The composite assembly of glass, interlayer, and wires is completed by subjecting it to heat and pressure in an autoclave according to conventional methods commonly practiced in the glass laminating art.

As illustrated in Fig. 6, a curved laminated unit 40 composed of curved glass plates 41 and 42 and an intervening interlayer 43 can be made with wires 45 in contact with the plate 41 in substantially the same relation to the glass as the wires 20 previously described. In this arrangement, the lower glass plate 42 first receives the interlayer 43 and then the other plate 41 with an intervening cellophane sheet is applied thereto. The assembly is first subjected to heat and pressure in the same manner as the elements shown in Fig. 3 until the interlayer is pressed and molded to the shape it will finally assume between the plates. Then the upper plate 41 is removed and the cellophane sheet discarded. The wires 45 are positioned and the upper plate 41 replaced. The entire assembly is then laminated under proper conditions of heat and pressure according to conventional practice. It will be noted in this instance that a separate molding plate is not employed, but that both of the glass plates to be laminated also serve as the molding forms to prepare the surface of the interlayer for receiving the wires.

In connection with the preparation of the wires in all of the forms shown and described above, it is desirable under certain conditions to subject such wires to oxidation to such degree as to dull their color so as to obviate reflection which might otherwise interfere with proper vision through the unit.

It is also to be understood that wire-supporting frames corresponding to the frame 22 are adapted to be used in connection with the application of the wires to the units shown in Figs. 4, 5, and 6.

Although illustrative examples of the invention have been shown and described in detail, it will be apparent to those skilled in the art that the invention is not so limited but that various changes can be made therein without departing from the spirit of the invention within the scope of the appended claims.

I claim:

1. In a method of making a laminated defrosting unit including glass plates bonded upon opposite sides of an adherent plastic interlayer; the steps which comprise applying an interlayer of adhesive plastic material on one side of a glass plate, applying a second glass plate in superposed relation upon the exposed side of the interlayer with an interposed non-adhesive medium to prevent the second plate from adhering to the interlayer, applying heat and pressure to the assembly thus formed until the plastic is pressed and molded to the final shape of the interlayer, subsequently removing the second plate and non-adhesive medium from the interlayer, applying wires to the exposed molded surface of the interlayer, applying a glass plate to the molded interlayer in contact with the wires and bonding the elements thus assembled under the action of heat and pressure to form a composite laminated unit.

2. In a method of making a laminated defrosting unit, the steps which comprise applying a layer of plastic adhesive material to one side of a glass plate, applying under uniform pressure a substantially non-adherent film upon the outer surface of the layer of plastic for smoothing the latter, removing the film, laying a series of metal strands upon the outer smoothed surface of the layer of plastic, applying a second glass plate upon the layer of plastic to cover it and the metal strands, and laminating the assembly thus formed under the action of heat and pressure sufficient to bond the glass and plastic into a composite unit with the metal strands contacting the second glass plate.

3. In a method of making a laminated defrosting unit, the steps which comprise applying a layer of plastic adhesive material to one side of a glass plate, pressing under a polished cover plate a substantially non-adherent film upon the outer surface of the layer of plastic for molding and smoothing the outer surface of the latter, removing the cover plate and film, laying a series of metal strands upon the outer smoothed surface of the layer of plastic, applying a glass plate upon the layer of plastic to cover it and the metal strands, and laminating the assembly thus formed under the action of heat and pressure sufficient to adhere the glass and plastic into a composite unit with the metal strands contacting the second glass plate.

4. In a method of making a laminated defrosting unit, the steps which comprise applying a layer of plastic adhesive material to one side of a glass plate, smoothing the outer surface of the layer of plastic to polished consistency corresponding substantially to the glass surface, adhering by heat and pressure a series of metal strands to the smoothed outer surface of the layer of plastic to prevent displacement thereof, applying a second glass plate upon the smoothed layer of plastic to cover it and the metal strands, and laminating the assembly thus formed under the action of heat and pressure sufficient to bond the glass and plastic into a unit with the metal strands contacting the second glass plate.

5. In a method of making a laminated defrosting unit composed of sheets of glass and plastic, the steps which comprise molding an interlayer sheet of organic plastic under heat and pressure between smooth surfaces of substantially the same contour and surface smoothness as the glass to be laminated, applying a series of metal strands to and across the molded surface of the sheet, applying glass sheets upon opposite sides of the molded interlayer with said strands thereon, and laminating the assembly thus formed under the action of heat and pressure sufficient to bond the glass and plastic into a composite unit with the metal strands contacting one of the glass sheets.

6. In a method of making a laminated defrosting unit composed of sheets of glass and plastic, the steps which comprise molding a sheet interlayer of organic plastic by applying thereto under heat and pressure heated smoothing surfaces corresponding substantially to the surface of at least one of the glass sheets, exposing one of the molded surfaces, applying a series of electric conductors to the exposed molded surface of the plastic interlayer, superposing a glass sheet upon said exposed molded surface and permanently laminating the assembly thus formed under the action of heat and pressure sufficient to bond the glass and plastic into a unit with the conductors on said interlayer in contact with the adjacent glass sheet.

7. In a method of making a laminated defrosting unit which includes two superposed glass plates with metal strands and a layer of plastic interposed between said plates; the steps which comprise applying a layer of plastic adhesive material to one side of one glass plate, pressing the other glass plate upon the outer surface of the layer of plastic to mold and smooth the outer surface of said layer to the surface contour of said second plate, removing said second glass plate, laying a series of metal strands upon the outer smoothed surface of the layer of plastic, reapplying said second glass plate upon the smoothed layer of plastic to cover it and the metal strands, and laminating the assembly thus formed under the action of heat and pressure sufficient to adhere the glass and plastic into a composite unit with the metal strands contacting the second glass plate.

HERMAN R. MARINI.

REFERENCES CITED

The following references are of record in the file of this patent:

UNITED STATES PATENTS

| Number | Name | Date |
|---|---|---|
| 1,223,583 | Hitchcock | Apr. 24, 1917 |
| 1,741,562 | Faguy | Dec. 31, 1929 |
| 2,156,680 | Dennison | May 2, 1939 |
| 2,184,485 | Challet | Dec. 26, 1939 |
| 2,222,742 | Ducret et al. | Nov. 26, 1940 |
| 2,268,266 | Ryan | Dec. 30, 1941 |